United States Patent [19]

Crockett et al.

[11] Patent Number: 5,619,644

[45] Date of Patent: Apr. 8, 1997

[54] SOFTWARE DIRECTED MICROCODE STATE SAVE FOR DISTRIBUTED STORAGE CONTROLLER

[75] Inventors: Robert N. Crockett; Ronald M. Kern; William F. Micka, all of Tucson, Ariz.

[73] Assignee: International Business Machines Corporation, Armonk, N.Y.

[21] Appl. No.: 529,901

[22] Filed: Sep. 18, 1995

[51] Int. Cl.⁶ ................................................. G06F 11/00
[52] U.S. Cl. .................... 395/183.21; 395/185.1; 395/185.07; 395/182.11
[58] Field of Search ............... 395/183.21, 182.03, 395/182.04, 182.13, 185.07, 182.18, 183.22, 185.1, 182.11

[56] References Cited

U.S. PATENT DOCUMENTS

| | | | |
|---|---|---|---|
| 3,704,363 | 11/1972 | Slmassy et al. | 395/183.21 |
| 4,947,397 | 8/1990 | Sobel et al. | 395/183.21 |
| 5,155,731 | 10/1992 | Yamaguchi | 395/183.21 |
| 5,239,637 | 8/1993 | Davis et al. | 395/425 |
| 5,388,219 | 2/1995 | Chan et al. | 395/275 |
| 5,446,871 | 8/1995 | Shomler et al. | 395/180 |
| 5,485,573 | 1/1996 | Tandon | 395/185.01 |
| 5,504,861 | 4/1996 | Crockett et al. | 395/182.11 |

*Primary Examiner*—Robert W. Beausoliel, Jr.
*Assistant Examiner*—Joseph E. Palys
*Attorney, Agent, or Firm*—F. E. Anderson; R. M. Sullivan

[57] ABSTRACT

A storage system improves error debugging by directing distributed system components associated with an error condition to temporarily suspend data processing for collecting failure information. The collected failure information is correlated for later analysis according to an issued diagnostic state save channel command word (CCW) that is triggered by the detection of said error condition. The storage system includes a host processor running applications generating record updates. A data mover in the host processor issues the diagnostic state save CCW upon receiving an error code from one of the system components. The failure information includes software, hardware and microcode control structures of the distributed system components.

20 Claims, 5 Drawing Sheets

SOFTWARE DIRECTED MICROCODE STATE SAVE FOR DISTRIBUTED STORAGE CONTROLLER

FIELD OF THE INVENTION

The present invention relates generally to hierarchical data storage, and more particularly, to improved state save operations across multiple components within a hierarchical data storage system.

BACKGROUND OF THE INVENTION

Data processing systems, in conjunction with processing data, typically are required to store large amounts of data (or records), which can be efficiently accessed, modified, and re-stored. Data storage is typically separated into several different levels, or hierarchically, in order to provide efficient and cost effective data storage. A first, or highest level of data storage involves electronic memory, usually dynamic or static random access memory (DRAM or SRAM). Electronic memories take the form of semiconductor integrated circuits wherein millions of bytes of data can be stored on each circuit, with access to such bytes of data measured in nano-seconds. The electronic memory provides the fastest access to data since access is entirely electronic.

A second level of data storage usually involves direct access storage devices (DASD). DASD storage, for example, can comprise magnetic and/or optical disks, which store bits of data as micrometer sized magnetically or optically altered spots on a disk surface for representing the "ones" and "zeros" that make up those bits of the data. Magnetic DASD, includes one or more disks that are coated with remnant magnetic material. The disks are rotatably mounted within a protected environment. Each disk is divided into many concentric tracks, or closely spaced circles. The data is stored serially, bit by bit, along each track. An access mechanism, known as a head disk assembly (HDA), typically includes one or more read/write heads, and is provided in each DASD for moving across the tracks to transfer the data to and from the surface of the disks as the disks are rotated past the read/write heads. DASDs can store giga-bytes of data with the access to such data typically measured in milli-seconds (orders of magnitudes slower than electronic memory). Access to data stored on DASD is slower due to the need to physically position the disk and HDA to the desired data storage locations.

A third or lower level of data storage includes tape and/or tape and DASD libraries. Access to data is much slower in a library since a robot or operator is necessary to select and load a requested data storage medium. The advantage is reduced cost for very large data storage capabilities, for example, tera-bytes of data storage. Tape storage is typically used for back-up purposes, that is, data stored at the second level of the hierarchy is reproduced for safe keeping on magnetic tape. Access to data stored on tape and/or in a library is presently on the order of seconds.

Having a back-up data copy is mandatory for many businesses as data loss could be catastrophic to the business. The time required to recover data lost at the primary storage level is also an important recovery consideration. An alternative form of back-up, dual copy, provides an improvement in speed over tape or library back-up. An example of dual copy involves providing additional DASD's so that data is written to the additional DASDs (sometimes referred to as mirroring). Then if the primary DASDs fail, the secondary DASDs can be depended upon for data. A drawback to this approach is that the number of required DASDs is doubled.

Another data back-up alternative that overcomes the need to double the storage devices involves writing data to a redundant array of inexpensive devices (RAID) configuration. In this instance, the data is written such that the data is apportioned amongst many DASDs. If a single DASD fails, then the lost data can be recovered by using the remaining data and error correction procedures. Currently there are several different RAID configurations available.

A back-up solution providing a greater degree of protection is remote dual copy which requires that primary data stored on primary DASDs be shadowed at a secondary or remote location. The distance separating the primary and secondary locations depends upon the level of risk acceptable to the user, and for synchronous data communications, can vary from just across a fire-wall to several kilometers. The secondary or remote location, in addition to providing a back-up data copy, must also have enough system information to take over processing for the primary system should the primary system become disabled. This is due in part because a single storage controller does not write data to both primary and secondary DASD strings at the primary and secondary sites. Instead, the primary data is stored on a primary DASD string attached to a primary storage controller while the secondary data is stored on a secondary DASD string attached to a secondary storage controller.

Remote dual copy falls into two general categories, synchronous and asynchronous. Synchronous remote copy allows sending primary data to the secondary location and confirming the reception of such data before ending a primary DASD input/output (I/O) operation (providing a channel end (CE)/device end (DE) to the primary host). Synchronous remote copy, therefore, slows the primary DASD I/O response time while waiting for secondary confirmation. Primary I/O response delay is increased proportionately with the distance between the primary and secondary systems—a factor that limits the remote distance to tens of kilometers. Synchronous remote copy, however, provides sequentially consistent data at the secondary site with relatively little system overhead.

Asynchronous remote copy provides better primary application system performance because the primary DASD I/O operation is completed (providing a channel end (CE)/device end (DE) to the primary host) before data is confirmed at the secondary site. Therefore, the primary DASD I/O response time is not dependent upon the distance to the secondary site and the secondary site could be thousands of kilometers remote from the primary site. A greater amount of system overhead is required, however, for ensuring data sequence consistency since data received at the secondary site will often arrive in an order different from that written on the primary DASDs. A failure at the primary site could result in some data being lost that was in transit between the primary and secondary location.

More recently introduced data disaster recovery solutions include remote dual copy wherein data is backed-up not only remotely, but also continuously. In a typical remote dual copy system, there may exist multiple primary processors connected, by multiple serial or parallel communication links, to multiple primary storage controllers, each having strings of primary DASDs attached thereto. A similar processing system may exist at a remote secondary site.

Given the increased system complexities introduced with remote copy, and the potential distances involved, debugging hardware, microcode and/or software problems becomes very complex. Conventional debugging techniques are extremely time consuming as symptoms of logic errors in hardware, software or microcode surface in the system over time, usually well after such problem has occurred. System debug is further complicated by running software distributed over both primary and secondary systems with the use of channel extender boxes, for extending communications from several hundred feet to anywhere in the world, including extending Enterprise Systems Connection (ESCON) channels. Hence, the magnitude of distributed debugging becomes nearly unmanageable.

Accordingly it is desired to provide a method and apparatus for co-ordinating problem determinations between distributed system components. For example, if a control unit returns an incorrect result, a data mover may direct the errant control unit and the associated host processor and application to save its state for problem determination co-ordination between hardware, software and/or microcode.

SUMMARY OF THE INVENTION

An object of the present invention is to provide an improved design and method for co-ordinating state saves between distributed components in a computer system.

Another object of the present invention is to provide coordinated state saves between host processors and storage controllers or between storage controllers.

Still another object of the present invention is to issue a channel command word (CCW) from a host processor for causing states to be saved in the host processor and at least one storage controller for debugging errors or otherwise analyzing system performance.

According to a first embodiment of the present invention, a method for coordinating problem determinations amongst distributed system components in a storage system is provided. The storage system includes a host processor running host applications therein and having a data mover. The host processor is coupled to a storage controller for providing record updates thereto. The method comprises issuing I/O operations from the host applications to the storage controller for storing record updates generated by the host applications. Control information, including record headers associated with the record updates are maintained in the storage controller. The data mover, at predetermined times, reads groups of the record updates and associated control information thereinto in preparation for remotely copying the record updates. If an error condition occurs in some component of the system, the error condition is detected in the data mover according to an error code received therein. In response to receiving the error code, the data mover issues a DIAGNOSTIC STATE SAVE channel command word (CCW) to the host processor and the storage controller. Failure information is immediately captured in the data mover and the storage controller. That failure information is thereafter correlated according to the detected error condition.

In another embodiment of the present invention, a data storage system co-ordinates failure information amongst system components associated with an error condition occurring in the data storage system, wherein the system components include software, hardware and microcode control structures. The system components include a host processor, and one or more storage controllers coupled to non-volatile storage devices for processing and storing record updates. The host processor runs applications that generate the record updates and transmit I/O operations to the one or more storage controllers for eventually storing the record updates on the non-volatile storage devices. The host processor further includes a data mover for reading the record updates from the one or more storage controllers and assembling the record updates into groups of self describing records for transmission to a remote storage system for disaster recovery purposes. When an error occurs, the data mover receives an error code from one of the system components indicating a type of error condition that occurred. In response, the data mover issues a state save command to those system components associated with the error condition for causing said associated system components to temporarily suspend processing record updates while collecting failure information. The failure information for each system component is correlated according to the state save command. The data mover includes a trace queue for storing failure information associated with the data mover, and a control section for managing record updates read into the data mover. A plurality of buffers are provided in the data mover for storing the record updates and their associated headers.

The foregoing and other objects, features, and advantages of the invention will be apparent from the following more particular description of a preferred embodiment of the invention, as illustrated in the accompanying drawing.

DETAILED DESCRIPTION

A typical data processing system may take the form of a host processor, such as an IBM System/360 or IBM System/370 processor for computing and manipulating data, and running, for example, data facility storage management subsystem/multiple virtual systems (DFSMS/MVS) software, having at least one IBM 3990 storage controller attached thereto, the storage controller comprising a memory controller and one or more cache memory types incorporated therein. The storage controller is further connected to a group of direct access storage devices (DASDs) such as IBM 3380 or 3390 DASDs. While the host processor provides substantial computing power, the storage controller provides the necessary functions to efficiently transfer, stage/destage, convert and generally access large databases.

Figure 1:
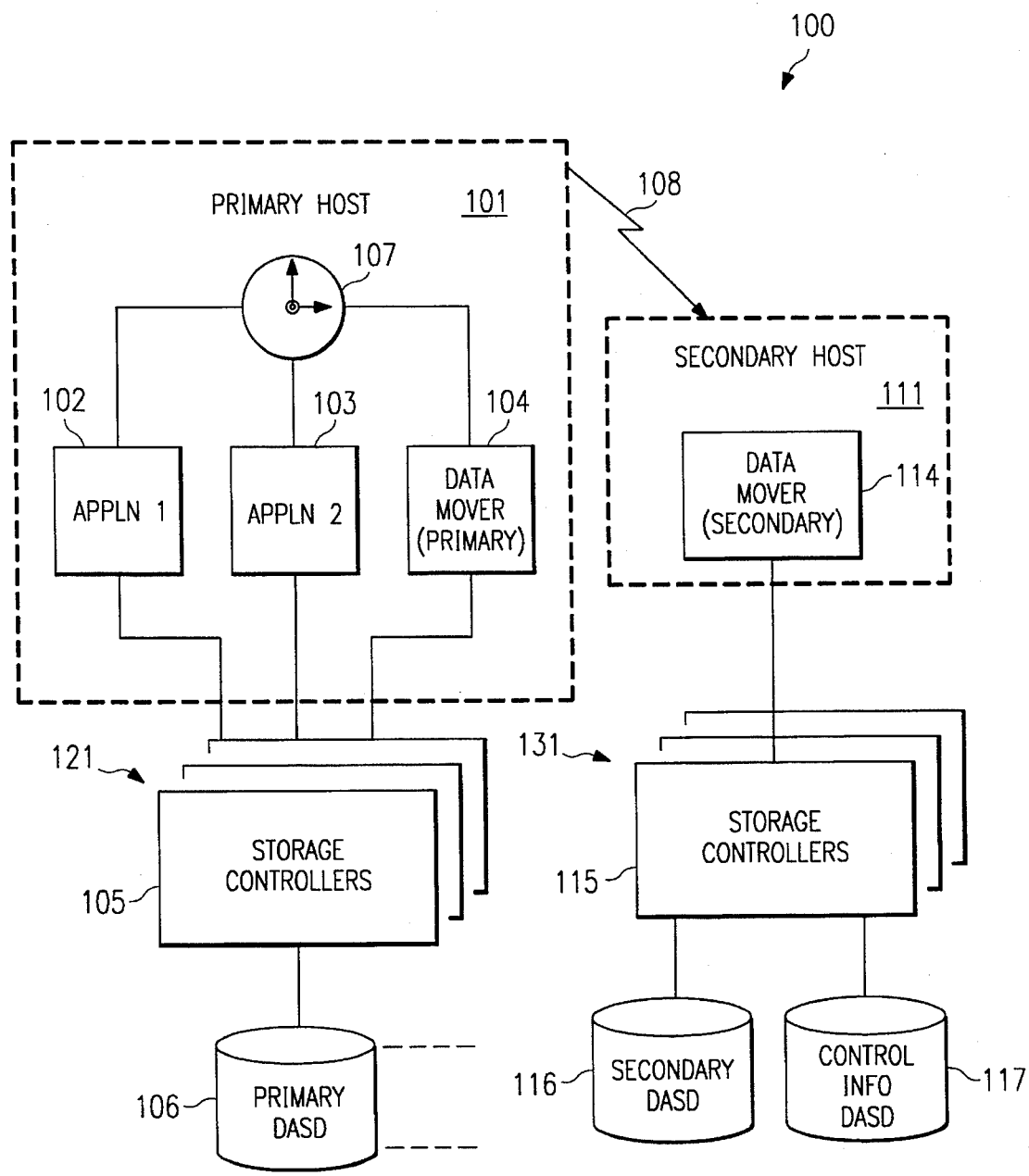
FIG. 1 is a block diagram depicting a remote dual copy system including primary and secondary sites.

FIG. 1 depicts an asynchronous disaster recovery system 100 including a primary site 121 and a remote or secondary site 131. The primary site 121 includes a primary processor 101, for example, an IBM ES/9000 running DFSMS/MVS host software. The primary processor 101 further includes application software 102 and 103, for example, IMS and DB2 applications, and a primary data mover (PDM) 104. A common sysplex clock 107 is included in the primary processor 101 for providing a common reference to all applications (102, 103) running therein, wherein all system clocks or time sources (not shown) synchronize to the sysplex clock 107 ensuring all time dependent processes are properly timed relative to one another. Primary storage controllers 105, for example, synchronize to a resolution appropriate to ensure differentiation between record write update times, such that no two consecutive write I/O operations to a single primary storage controller 104 will likely exhibit the same time stamp value. The resolution, and not the accuracy, of the sysplex timer 107 is critical. The PDM 104, though shown connected to the sysplex timer 107, is not required to synchronize to the sysplex timer 107 since write I/O operations are not generated therein. A sysplex timer 107 is not required if the primary processor 101 has a single time reference (for example, a single multi-processor ES/9000 system).

The plurality of primary storage controllers 105, for example, IBM 3990 Model 6 storage controllers, are connected to the primary processor 101 via a plurality of channels, for example, fiber optic channels. Connected to each primary storage controller 105 is at least one string of primary DASDs 106, for example, IBM 3390 DASDs. The primary storage controllers 105 and the primary DASDs 106 form a primary storage subsystem. Each primary storage controller 105 and primary DASD 106 need not be separate units, but may be combined into a single drawer.

The secondary site 131, located for example, some thousands of kilo-meters remote from the primary site 121, similar to the primary site 121, includes a secondary processor 111 having a secondary data mover (SDM) 114 operating therein. Alternatively, the primary and secondary sites can be the same location, and further, the primary and secondary data movers 104 and 114, respectively, can reside on a single host processor (secondary DASDs 116 may be just over a fire-wall). A plurality of secondary storage controllers 115 are connected to the secondary processor 111 via channels, for example, fiber optic channels, as is known in the art. Connected to the secondary storage controllers 115 are a plurality of secondary DASDs 116 and a control information DASD(s) 117. The secondary storage controllers 115 and DASDs 116 and 117 comprise a secondary storage subsystem.

The primary site 121 communicates with the secondary site 131 via a communication link 108. More specifically, the primary processor 101 transfers data and control information to the secondary processor 111 by a communications protocol, for example, a virtual telecommunications access method (VTAM) communication link 108. The communication link 108 can be realized by several suitable communication methods, including telephone (T1, T3 lines), radio, radio/telephone, microwave, satellite, etc.

The asynchronous data shadowing system 100 encompasses collecting control data from the primary storage controllers 105 so that an order of all data writes to the primary DASDs 106 is preserved and applied to the secondary DASDs 116 (preserving the data write order across all primary storage subsystems). The data and control information transmitted to the secondary site 131, must be sufficient such that the presence of the primary site 121 is no longer required to preserve data integrity.

The applications 102, 103 generate data or record updates, which record updates are collected by the primary storage controllers 105 and read by the PDM 104. The primary storage controllers 105 each groups its respective record updates for an asynchronous remote data shadowing session and provides those record updates to the PDM 104 via non-specific primary DASD 106 READ requests. Transferring record updates from the primary storage controllers 105 to the PDM 104 is controlled and optimized by the PDM 104 for minimizing a number of START I/O operations and time delay between each read, yet maximizing an amount of data transferred between each primary storage controller 105 and the primary processor 101. The PDM 104 can vary a time interval between non-specific READs to control this primary storage controller-host optimization as well as a currency of the record updates for the secondary DASDs 116.

Collecting record updates by the PDM 104, and transmitting those record updates to the SDM 114, while maintaining data integrity, requires the record updates to be transmitted for specific time intervals and in appropriate multiple time intervals with enough control data to reconstruct the primary DASDs 106 record WRITE sequence across all primary storage subsystems to the secondary DASDs 116. Reconstructing the primary DASDs 106 record WRITE sequences is accomplished by passing self describing records from the PDM 104 to the SDM 114. The SDM 114 inspects the self describing records for determining whether any records for a given time interval have been lost or are incomplete.

Figure 2:
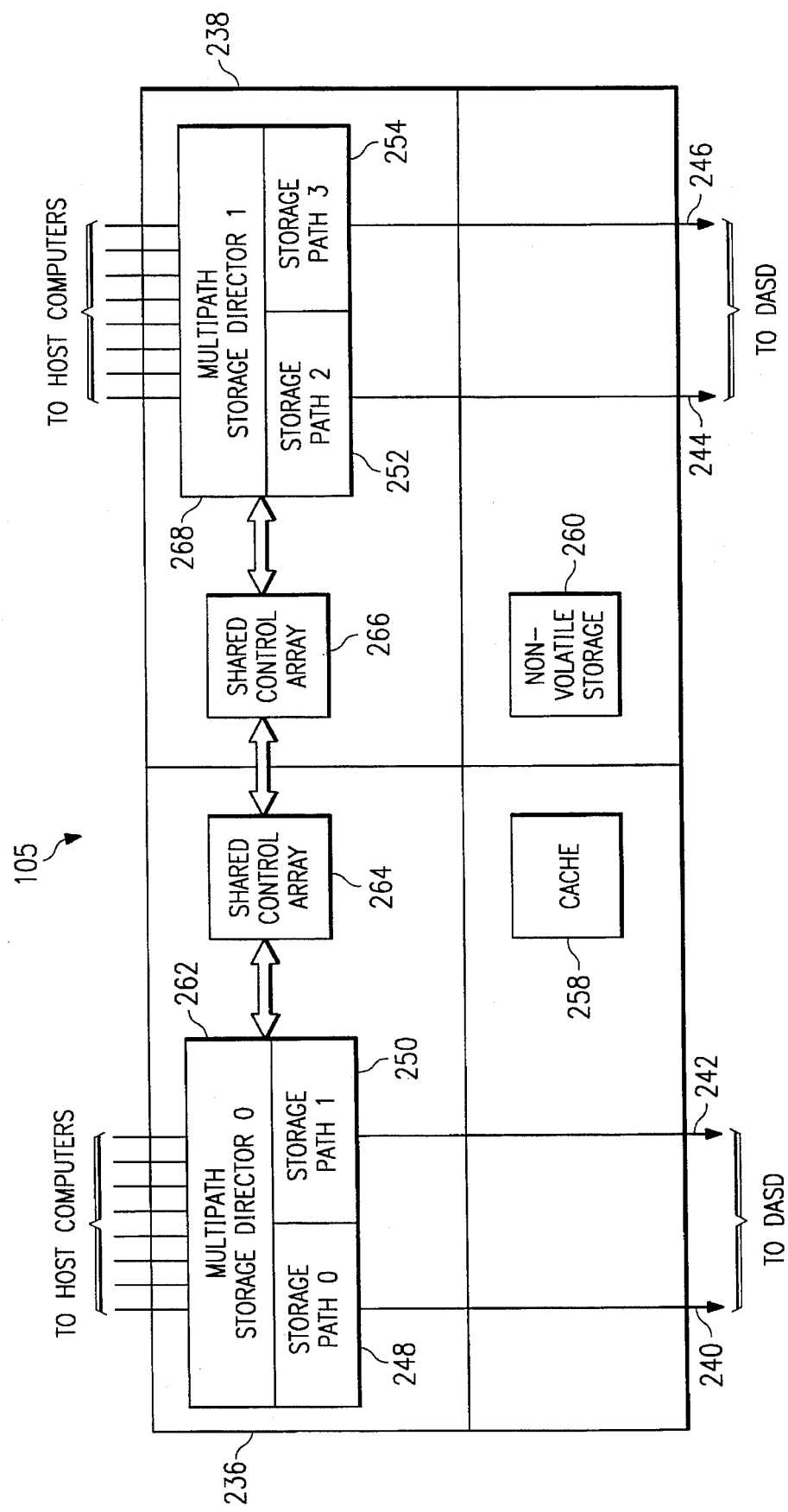
FIG. 2 is a block diagram of a storage controller in the remote dual copy system depicted in FIG. 1.

FIG. 2 depicts the components of a primary (or secondary) storage controller 105. The storage controller 105 includes dual cages 236 and 238 (separately powered for increased availability) each having a multipath storage director 262 and 268, which in turn has two storage paths (SPs) 248, 250, 252 and 254. Each storage path 248, 250, 252 and 254 contains a microprocessor capable of interpreting channel command words (CCWs) received from the host processor and controlling the attached DASDs.

Further, each cage 236 and 238 contains a shared control array (SCA) storage 264 and 266. Each SCA 264 and 266 stores local status information as well as status information shared with the other SCA located in the other cage within the storage controller 105. In this way, unless there is a failure condition present in one or both of the cages 236, 238, the contents of the SCAs 264 and 266 is identical. Typical shared data includes device status and reconnection data as well as a variety of external registers used by microprocessors contained in each of the storage paths 248, 250, 252 and 254. SCA data is accessible to all four storage paths 248, 250, 252 and 254.

High speed memory, cache 258 and non-volatile storage (NVS) 260 are provided in the cages 236 and 238, respectively. Data that is being moved between the host and the DASDs may be temporarily stored in the cache 258 for improving system throughput. Data received from the host may also be copied in the NVS 260, for example, for providing DASD fast write capabilities as is well known in the industry. Other configurations are also known, for example, providing a cache and NVS memory in each cage 236 and 238 for still further increased data availability.

Figure 3:
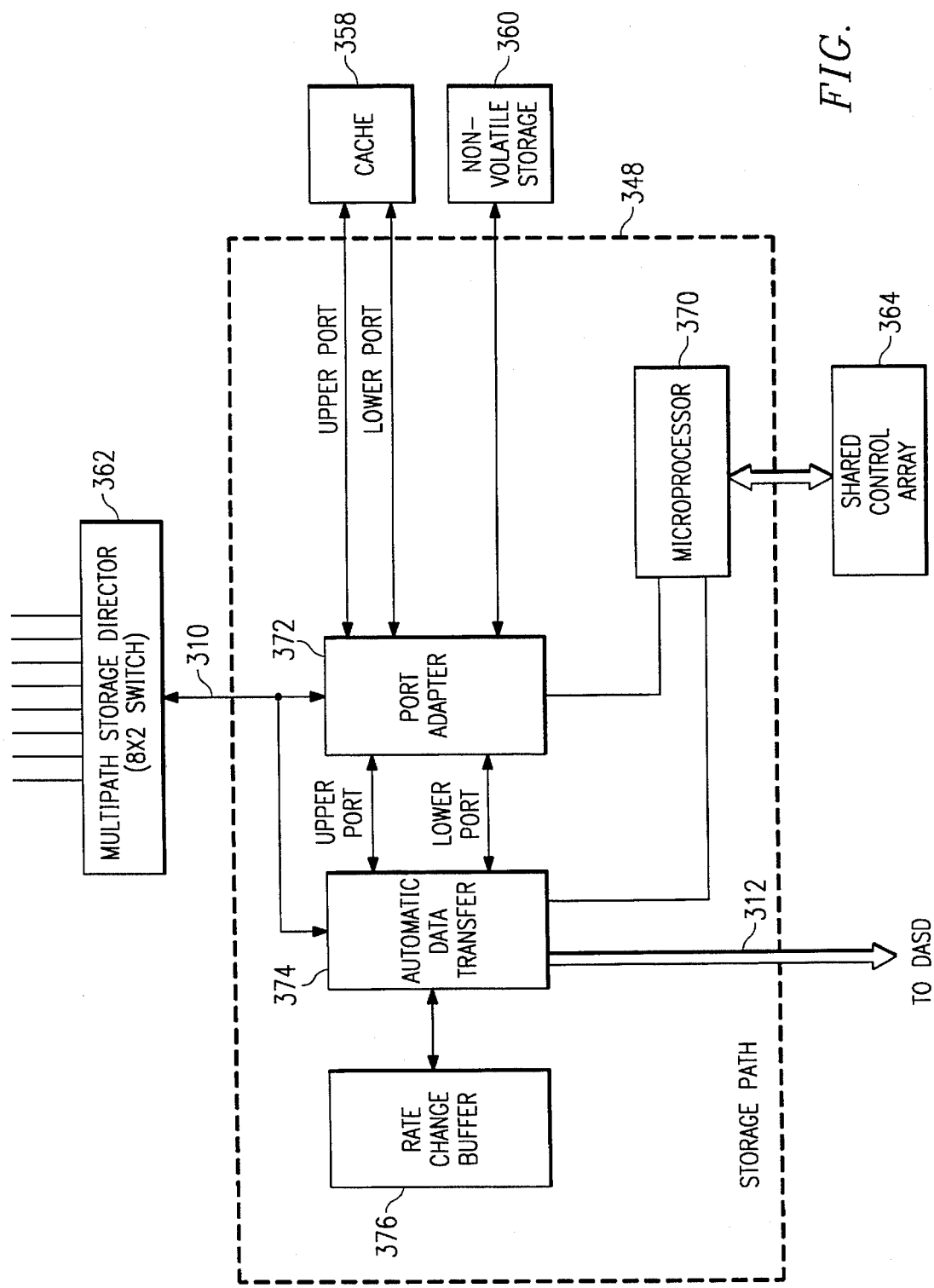
FIG. 3 is a block diagram of a storage path processor contained within the storage controller depicted in FIG. 2.

FIG. 3 shows one of the four storage paths 248 in the storage controller 105 in a block diagram schematic. All four storage paths 248, 250, 252 and 254 being identical, only one will be described herein. Storage path 248 is connected to an eight by two switch 362 by an upper port 310 and to a plurality of DASDs by a lower port 312. Data transfer between the multipath storage director 362 and one of the DASDs during direct DASD operations occurs via an automatic data transfer circuit (ADT) 374 supported by a rate change buffer 376, if required. Rate change buffer 376 compensates for differences between the speed of data transference by DASD and that of channel to host communications. Channel transfers typically occur at a much higher rate than DASD to controller transfers.

The storage path 348 also contains a microprocessor 370 which functions to control all operations taking place on the storage path 348. The microprocessor 370 executes microinstructions which are loaded into a control store (not shown) through an external support facility. A port adaptor (PA) 372 provides control data paths for the transfer of data between the cache 358, NVS memory 360, microprocessor 370 and upper and lower ports 310 and 312.

The cache 358 contains two ports (upper and lower) to allow for two simultaneous data transfers to and/or from the cache element 358. By way of example, data may be transferred from the cache 358 and the channel 310 while also transferring data to the cache 358 from DASD. Data transfer is typically set up by the microprocessor 370 and then taken over by an automatic data transfer 374 function without additional intervention from the microprocessor 370 until data transfer termination.

Figure 4:
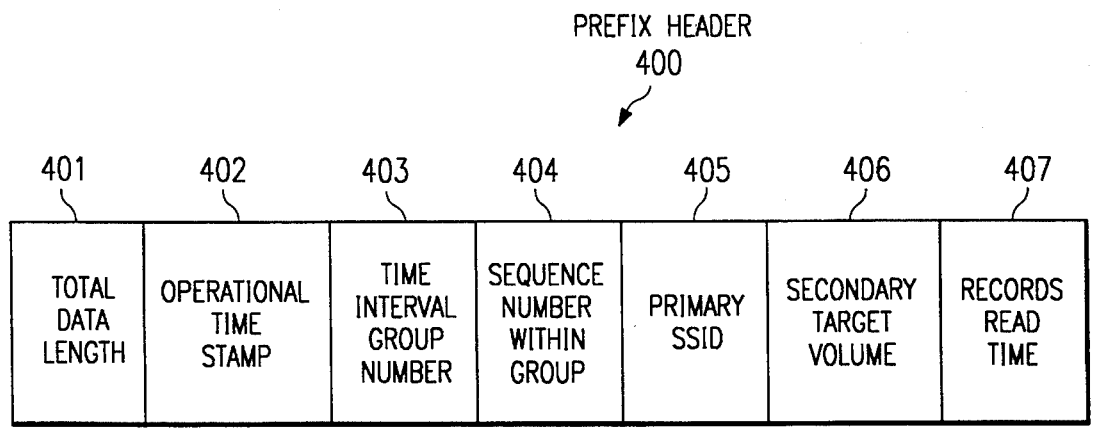
FIG. 4 is a diagram showing a header data structure for record updates in the storage controller depicted in FIG. 2.

FIG. 4 shows a prefix header 400 as generated by the primary storage controller 105, which is thereafter used by the PDM 104 for grouping sets of self describing records. Each self describing record is further journaled by the SDM 114 for each time interval so that each self describing record can be applied in time sequence for each time interval to the secondary DASDs 116. The prefix header 400, which is inserted at the front of each group or record set, includes a total data length 401 for describing the total length of the prefix header 400 and actual primary record set information that is transmitted to the SDM 114 for each record set. An operational time stamp 402 is a time stamp indicating a start time for the operational set that the PDM 104 is currently processing. The operational time stamp 402 is generated by the PDM 104 (according to the sysplex timer 107) when performing a READ RECORD SET function to a set of the primary storage controllers 105. An I/O time of the primary DASDs 106 write is unique for each primary storage controller 105 READ RECORD SET. The operational time stamp 402 is common across all storage controllers.

A time interval group number 403 is supplied by the PDM 104 to identify a time interval (bounded by operational time stamp 402 and a records read time 407) for which the current record sets belong (sets of records across all primary storage controllers 105 for a given time interval group form consistency groups). A sequence number within group 404 is a hardware provided identification (to the PDM 104) of a sequence of application WRITE I/Os for the primary storage controller 105 for each record set within a given time interval group 403. A primary SSID (substorage identification) 405 uniquely identifies the specific primary storage controller of the primary storage controllers 405 for each record set. A secondary target volume 406 is assigned by either the PDM 104 or the SDM 114 depending upon performance considerations. A records read time 407 supplies an operational time stamp that is common to all primary storage controllers 105 indicating an end time for the record set of the current interval.

Previously, system diagnostic information was collected based upon an operator issuing a generalized trace facility (GTF). The GTF is able to collect system hardware information based upon hooks designed into the system. GTF, however, is not triggered at the time of the error, but rather GTF captures data according to a post-processing function, hence, key debugging data is lost due to unavailability. In view of increased system complexities with certain platforms offering combined hardware/microcode/software solutions, improved debugging techniques are required. Solutions such as peer to peer remote copy (PPRC) and extended remote copy (XRC), having multiple primary and secondary storage controllers, requires distributed debugging for effective product quality maintenance. Such distributed diagnostics effectively merges (merged diagnostics) hardware, microcode and software trace information across system components at the time a failure is detected.

The merged diagnostics is effected by a new channel command word (CCW), for example, DIAGNOSTIC STATE SAVE, which is triggered by either the software or hardware upon an initial problem detection. Issuing the DIAGNOSTIC STATE SAVE CCW causes the system to capture critical software, hardware and/or microcode control structures required for debugging the problem.

Such control structure information is then merged by a component trace function into its continuous diagnostic trace information for capturing a complete picture of the host software environment merged with the internal storage controller microcode/hardware environment across one or multiple storage controllers. Prior to this merged diagnostics solution, external symptoms that caused a particular I/O operation to fail caused the hardware to off-load sense data on that specific hardware error. In remote copy applications, such off-load could occur well beyond the time when the actual error occurred.

Figure 5:
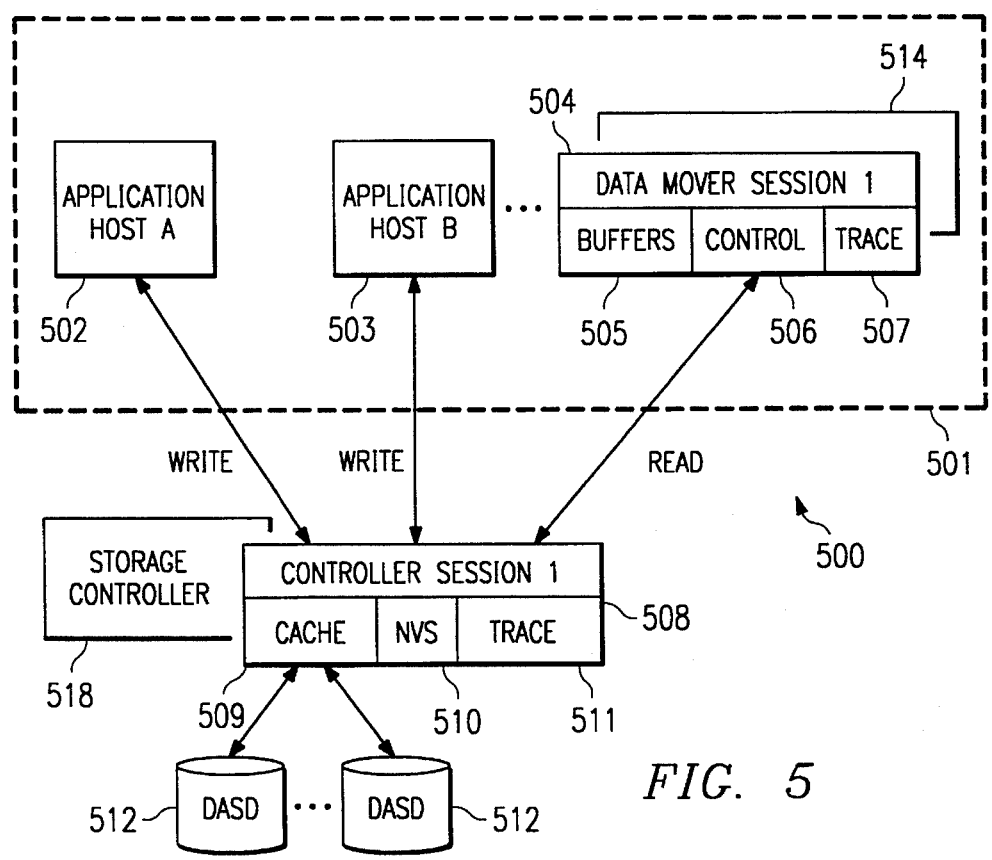
FIG. 5 is a block diagram of a primary site storage system according to a preferred embodiment of the present invention.

FIG. 5 depicts a primary site 500 wherein several applications 502, 503 are running in a host processor 501, for writing record updates to DASDs 512 via storage controller 508 (or via multiple storage controllers 508, 518). A data mover 504 reads the record updates and prefix header associated therewith (see FIG. 4) for transmission to a secondary site for maintaining a copy. A secondary site (for example, as shown in FIG. 1) is not shown in FIG. 5 for ease of illustration. Such secondary site is coupled to the primary site 500 either locally (for example, synchronously via Enterprise Systems Connectivity (ESCON)) or long distance asynchronously over radio-telephone type transmissions. A secondary data mover 514, for example, may be present at the host processor 501 as shown, or may be present in the secondary site (not shown) according to system requirements.

The data mover 504 issues the DIAGNOSTIC STATE SAVE CCW upon detecting an error condition, wherein the host processor 501 and the storage controller 508 collect certain software/hardware/microcode control structure information. Exemplary error conditions include a track information field (TIF) record count not equal to an actual number of records; a TIF no data set to "off" while the record count is equal to zero; a TIF operation field indicating an invalid combination state; a mismatch in record length shown in the TIF; and no pseudo count at the end of a record. A trace 507 exists in the data mover 504 which includes a separate address space for storing data mover trace diagnostics. The address space in the current embodiment is a wrap around debugging space. These data mover trace diagnostics include return codes that identify the error type that caused the trace to be initiated, flag conditions and header information.

A control 506 is also provided in the data mover 504. The control 506 is a data manager that stores information for controlling I/O operations, maps buffer space to associated storage controllers, and sorts I/O operations according to time stamps for forming consistency groups of record updates for eventual transmission to the secondary site. Buffers 505 are managed by the control 506 and store the actual data (record updates) as well as the TIF.

The storage controller 508 includes a cache 509 that is typically segmented for different record update sessions. A non-volatile storage (NVS) 510 provides storage space for the record updates, in part, to effect DASD fast write operations. A trace 511 causes the storage controller 508 to save appropriate state information. If a state save is already in progress in the storage controller 508 when this order is received, then another state save will not be performed. Data that is transferred as a result of the DIAGNOSTIC STATE SAVE CCW includes:

Indication of state save: force State Save, generic state save, or Remote Copy state save;

Session ID value;

Sequence number of a relevant read record set;

System ABEND code;

Reason Code detected by Host Software; and

Time of day stamp (TOD)

A method is thus provided in the storage controller to gather data that is required to complete problem determination in complex situations. In particular, the data read from the storage controller for Extended Remote Copy may be incorrect and information needed to debug may exist in the queue structures in cache. Sometimes, the event causing the anomaly condition has occurred in the past. The probability of having the necessary data to debug the anomaly condition is maximized by providing the data mover session identifier and sequence number from the TIF of the read record set that the software is working with.

The state save function allocates, for example, 64 k bytes of data in cache, which is further divided into four 16 k blocks. The queue structures in cache occupy up to thirty-two 16 k byte segments. Thus, the storage controller does not provide enough state save storage to save all of the segments. Microcode, therefore, will select proper cache segments, using the sequence number. The segment that contains the identified record set, N, and the next adjacent segment, N+1, are provided. Additionally, the first and last segments in the list will be provided (hence the four segments).

Figure 6:
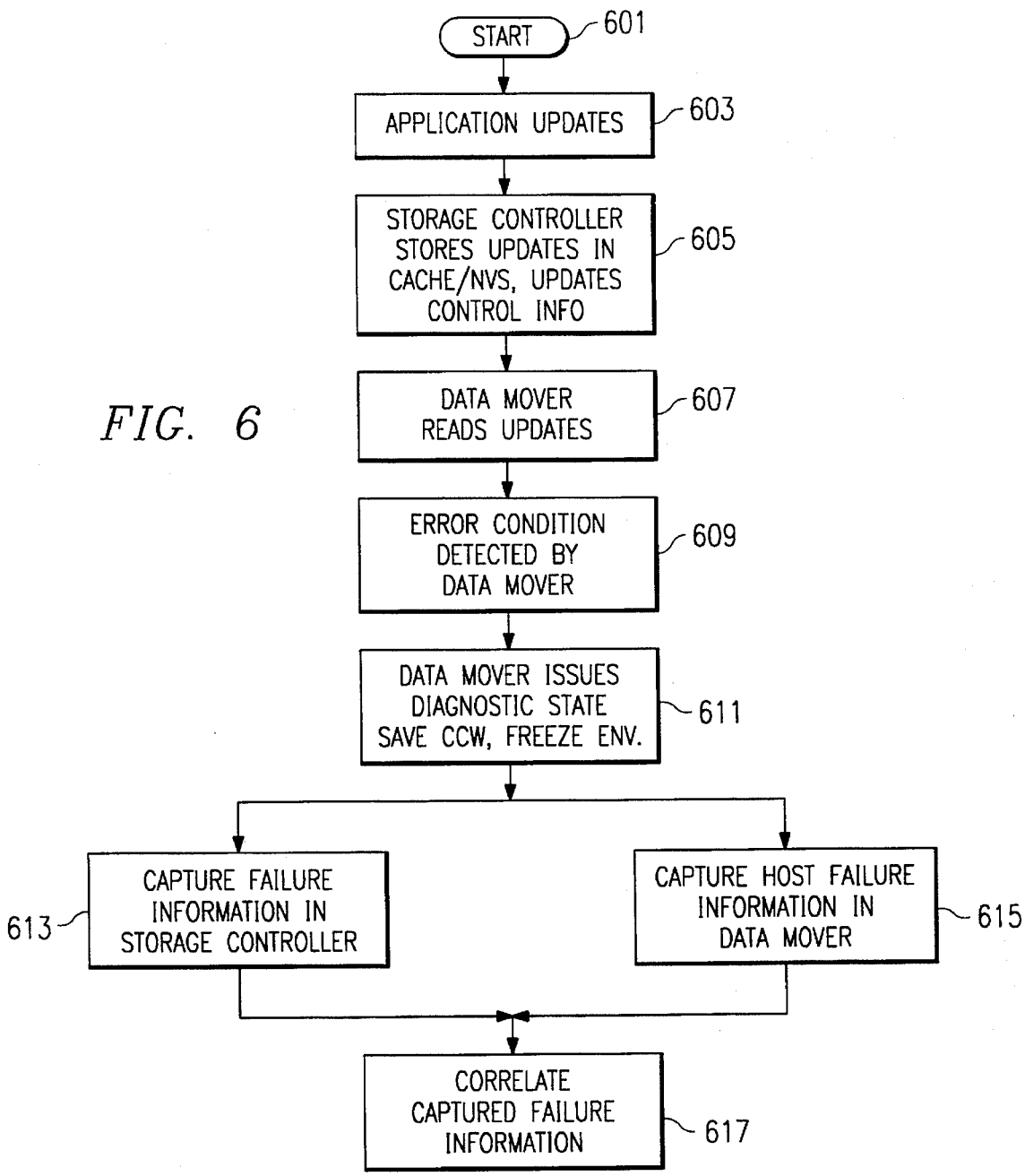
FIG. 6 is a flow chart diagramming a method of co-ordinating failure information amongst the system components of FIG. 5 according to a preferred embodiment of the present invention.

FIG. 6 is flow diagram showing the process of issuing a DIAGNOSTIC STATE SAVE CCW for merging hardware, software and microcode control structures. The process begins at step 601 and at step 603 the applications running in one or more host processors are issuing record updates to the one or more storage controllers. At step 605 each storage controller stores updates directed thereto to its internal cache and/or NVS and updates the control information (header) associated therewith accordingly. The data mover next reads records updates into its buffers at step 607. An error condition is detected by the data mover in step 609. Based upon detecting an error condition, the data mover issues the DIAGNOSTIC STATE SAVE CCW. Contemporaneously therewith, the environment including the storage controller and host processor associated with the error condition are frozen.

The storage controller initiates a dump to capture failure information at step 613. For example the storage controller captures control structures, cache directory entries, remote copy, changed data queues and certain microcode data areas. Also, at step 615 the host processor initiates a dump for capturing failure information. For example, the host processor captures host internal control structures. The captured failure information is stored in the trace buffers of the storage controller and data mover and can then be correlated according to time, event, etc. at step 617. This data is analyzed to determine the cause of the error condition.

Figure 7:
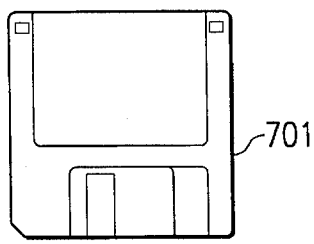
FIG. 7 is a computer readable memory for storing computer instructions carrying out the method of FIG. 6.

FIG. 7 shows a computer readable storage medium 701 capable of storing data structures, computer instructions or application programs in a form that is readily interpreted by a processor. The steps of FIG. 6, are thus storable on the computer readable storage medium 701 as a series of computer instruction capable of directing the storage system for carrying out the invention. The computer readable storage medium 701 is depicted as a floppy disk as is well known in the industry. The computer readable storage medium 701 is not meant to be limited to a floppy disk, but rather is limited only by an ability to reliably store data and/or instructions in computer readable form. For example, other equally suitable forms of computer memory include dynamic random access memory (DRAM), optical disks, magnetic tape, DASDs, read only memory (ROM), etc.

The preceding description was limited to an error condition occurring in the primary site. However, this concept is equally applicable across primary and secondary systems. For example, a data mover (there may be first and second data movers in a single host processor) at the primary site can issue a DIAGNOSTIC STATE SAVE CCW to the storage controller at the secondary site and the failure information therefrom can be correlated accordingly.

In summary, a data storage system having distributed components and disaster recover capability improves error debugging by capturing failure information from appropriate system components at the time the error is detected and co-ordinating the failure information for error analysis. The failure information combines software, hardware and microcode control structures. The data storage system includes a primary site for processing data and a secondary site for receiving copies of the data for disaster recovery purposes. The primary site includes a plurality of storage controllers, each having a cache memory, a control buffer and a trace buffer. A primary host processor runs applications generating record updates and transmits an I/O operation for each record update to the plurality of storage controllers for temporarily writing the record updates thereto. The primary host processor also includes a primary data mover for reading the record updates from the plurality of storage controllers and assembles the record updates into groups of self describing record sets. Upon receiving an error code from one of the system components indicating a type of error condition that occurred, the data mover issues a Diagnostic State Save channel command word (CCW) directed to those system components associated with the error condition for causing the associated system components to temporarily suspend processing record updates for collecting failure information. The failure information is correlated according to the Diagnostic State Save CCW. The primary data mover comprises a trace queue for storing failure information associated with the primary data mover, a control section for managing record updates read into the primary data mover and a plurality of buffers for storing the record updates and their associated headers. A plurality of primary direct access storage devices (DASDs) are coupled to the plurality of primary storage controllers for receiving the record updates therefrom. A secondary data mover is coupled for receiving the groups of self describing record sets and is responsive to the Diagnostic State Save CCW. A secondary host processor is coupled to the secondary data mover and is also responsive to the Diagnostic State Save CCW. A plurality of secondary storage controllers are coupled to the secondary host processor and are responsive to the Diagnostic State Save CCW. A plurality of secondary DASDs are provided for storing the groups of self describing record sets.

While the invention has been particularly shown and described with reference to preferred embodiments thereof, it will be understood by those skilled in the art that various changes in form and details may be made therein without departing from the spirit and scope of the invention. For example, the storage devices could be tape, optics, etc. Changes in future embodiments of the invention can therefore be made without departing from the teachings herein.

What is claimed is:

1. In a storage system having distributed system components including a host processor running software applications therein generating record updates and having a data mover, said host processor coupled to a first storage controller, wherein an error condition occurs in said storage system, said data mover executing a machine effected method for coordinating problem determinations amongst said distributed system components, said machine effected method comprising steps of:

(a) issuing I/O operations for record updates generated by said software applications;

(b) storing said record updates in said first storage controller according to said issued I/O operations;

(c) maintaining control information associated with said record updates in said first storage controller;

(d) reading said record updates and associated control information into said data mover from said first storage controller in preparation for remotely copying said record updates;

(e) detecting the storage system error condition in said data mover;

(f) issuing a diagnostic state save channel command word (CCW) from said data mover to said host processor and said first storage controller;

(g) capturing failure information in said host processor and said first storage controller; and (h) correlating said failure information in said host processor with said failure information in said first storage controller according to said storage system error condition, wherein said diagnostic state save channel command word temporarily suspends operations in said host processor and said storage controller until after said failure information is captured and correlated between said host processor and said first storage controller.

2. The method according to claim 1 further comprising a step (i) of analyzing the correlated failure information for determining a cause of the error.

3. The method according to claim 1 wherein said step (e) further comprises receiving an error code into the data mover indicating an error type.

4. The method according to claim 1 wherein said step (g) further comprises storing the host processor failure information in a circular trace buffer in said data mover.

5. The method according to claim 4 wherein said host processor failure information further comprises:

hardware control structures pertaining to said host processor; and software control structures corresponding to said software applications running within said host processor.

6. The method according to claim 1 wherein said step (g) further comprises storing the first storage controller failure information in a circular trace buffer in said first storage controller.

7. The method according to claim 6 wherein said first storage controller failure information further comprises:

hardware control structures pertaining to said first storage controller; and microcode control structures pertaining to said first storage controller.

8. The method according to claim 1 wherein said step (f) further comprises issuing said diagnostic state save CCW to a second storage controller at a remote location.

9. A computer readable storage medium for storing a data mover application for causing state save diagnostics to be merged across multiple system components in response to a storage system error, said system components including a host processor coupled to a storage controller for managing record updates generated by software applications to a direct access storage device (DASD), said data mover application comprising:

means for issuing I/O operations for record updates generated in said software applications;

means for storing said record updates in said first storage controller according to said issued I/O operations;

maintenance means for maintaining control information associated with said record updates in said storage controller;

reading means for reading said record updates and associated control information into said data mover in preparation for remotely copying said record updates;

detecting means for detecting a storage system error condition and communicating said error condition to said data mover;

state save means for issuing a diagnostic state save channel command word (CCW) from said data mover to said host processor and said storage controller;

capture means for capturing failure information in said host processor and said storage controller; and correlating means for correlating said failure information in each system component of said multiple system components according to the detected error condition.

10. The data mover application according to claim 9 wherein said state save means suspends the operation of said storage controller and a software application associated with said error condition until said capture means has completed capturing said failure information and said correlating means has completed correlating said failure information from said host processor with said failure information from said storage controller.

11. The data mover application according to claim 9 wherein said detecting means further receives an error code into the data mover indicating an error type of said error condition.

12. The data mover application according to claim 9 wherein said capture means further comprises storing the host processor failure information in a circular trace buffer in said data mover.

13. The method according to claim 12 wherein said capture means further comprises storing said storage controller failure information in a circular trace buffer in said storage controller.

14. A data storage system for coordinating failure information amongst system components associated with an error condition occurring in said data storage system, said system components including one or more storage controllers coupled to non-volatile storage devices for storing record updates thereon, said data storage system comprising:

a host processor running software applications thereon, said applications generating the record updates and transmitting I/O operations to said one or more storage controllers for eventual storage on said non-volatile storage devices, said host processor further including a first data mover for reading said record updates from said one or more storage controllers and assembling said record updates into groups for transmission to a remote storage system for disaster recovery purposes, said data mover receiving an error code from one of said system components indicating a type of error condition that occurred, said data mover issuing a State Save command to those system components associated with said error condition, said State Save command causing said associated system components to temporarily suspend processing record updates for collecting failure information, said failure information being correlated amongst said system components according to the State Save command, said data mover further comprising:

a trace queue for storing failure information associated with said data mover;

a control section for managing record updates read into said data mover; and a plurality of buffers for storing said record updates and header information associated with said record updates.

15. The data storage system according to claim 14 further comprising a remote data mover coupled for receiving the groups of record updates from said data mover.

16. The data storage system according to claim 14 wherein the non-volatile storage devices are direct access storage devices (DASDs).

17. The data storage system according to claim 15 further comprising a remote data storage system coupled for receiving the groups of record updates from said remote data mover for storage therein, said remote data storage system responsive to said issued state save instruction when the error condition occurs in said remote storage system.

18. The data storage system according to claim 17 wherein said remote storage system further comprises:

a remote host processor;

a remote storage controller coupled to said remote host processor; and a remote non-volatile storage device coupled to said remote storage controller for storing said groups of record updates thereon.

19. The data storage system according to claim 14 wherein said failure information includes software, hardware and microcode control structures.

20. A disaster recovery data storage system having a primary site for processing data and having a secondary site receiving copies of the data for disaster recovery purposes, said disaster recovery data storage system having distributed system components with software, hardware and microcode control structures embedded therein, said disaster recovery data storage system aiding error debugging by triggering the co-ordination and capture of failure information amongst the distributed system components associated with a particular error condition occurring in said disaster recovery data storage system, said disaster recover data storage system comprising:

a plurality of storage controllers, each storage controller having a cache memory, a control buffer and a trace buffer;

a primary host processor running applications thereon, said applications generating record updates and transmitting an I/O operation for each record update to said plurality of storage controllers for writing said record updates thereto, said host processor further including a primary data mover for reading said record updates from said plurality of storage controllers and assembling said record updates into groups of self describing record sets, said primary data mover receiving an error code from one of said distributed system components indicating a type of error condition that occurred, said primary data mover issuing a Diagnostic State Save channel command directed to those distributed system components associated with said error condition for causing said associated system components to temporarily suspend processing record updates for collecting failure information, such failure information being correlated according to the Diagnostic State Save channel command, said data mover further comprising:

a trace queue for storing failure information associated with said primary data mover;

a control section for managing record updates read into said primary data mover; and a plurality of buffers for storing said record updates and their associated headers;

a plurality of primary direct access storage devices (DASDs) coupled to said plurality of primary storage controllers;

a secondary host processor coupled to the secondary data mover and responsive to said Diagnostic State Save channel command;

a secondary data mover coupled for receiving the groups of self describing record sets and responsive to said Diagnostic State Save channel command;

a plurality of secondary storage controllers coupled to said secondary host processor and responsive to said Diagnostic State Save channel command; and a plurality of secondary DASDs for storing said groups of self describing record sets.

* * * * *